US006564951B2

(12) United States Patent
Hatami

(10) Patent No.: US 6,564,951 B2
(45) Date of Patent: May 20, 2003

(54) PLANAR STORAGE AND DISPLAY DEVICE

(76) Inventor: James Hatami, 5319 Etiwanda Ave., Tarzana, CA (US) 91356

( * ) Notice: Subject to any disclaimer, the term of this patent is extended or adjusted under 35 U.S.C. 154(b) by 0 days.

(21) Appl. No.: 09/894,075

(22) Filed: Jun. 28, 2001

(65) Prior Publication Data

US 2002/0011456 A1 Jan. 31, 2002

Related U.S. Application Data

(60) Provisional application No. 60/215,628, filed on Jun. 30, 2000.

(51) Int. Cl.[7] ............................... A47F 5/00; A47F 7/16
(52) U.S. Cl. ......................................... 211/162; 211/46
(58) Field of Search ............... 211/162, 46; 414/331.01

(56) References Cited

U.S. PATENT DOCUMENTS

| | | | | |
|---|---|---|---|---|
| 746,506 A | * | 12/1903 | Haviland et al. ............. 211/46 |
| 3,185,309 A | * | 5/1965 | Radek ........................... 211/46 |
| 4,030,609 A | * | 6/1977 | Liebetrau et al. ............ 211/162 |
| 4,666,047 A | * | 5/1987 | Fletcher ........................ 211/162 |
| 5,031,782 A | * | 7/1991 | Minervini .................... 211/162 |
| 5,181,334 A | * | 1/1993 | Mima ............................ 40/446 |
| 5,452,809 A | * | 9/1995 | Capel ............................ 211/47 |
| 5,680,938 A | * | 10/1997 | Rubinstein .................... 211/46 |
| 5,924,577 A | * | 7/1999 | Gessert ......................... 211/162 |

* cited by examiner

Primary Examiner—Daniel P. Stodola
Assistant Examiner—Erica B Harris

(57) ABSTRACT

A storage and display system may include one or more stackable and alignable storage frames, each storage frame including one or more storage tracks. A movable display frame that may pivot may be used to align a display track with one of the storage tracks to accept an item stored thereon. The display track may be lowered or pivoted to properly display the item, motion of the display frame and track may be controlled by computer. The display frame and track may also be used to load and unload the storage tracks.

13 Claims, 6 Drawing Sheets

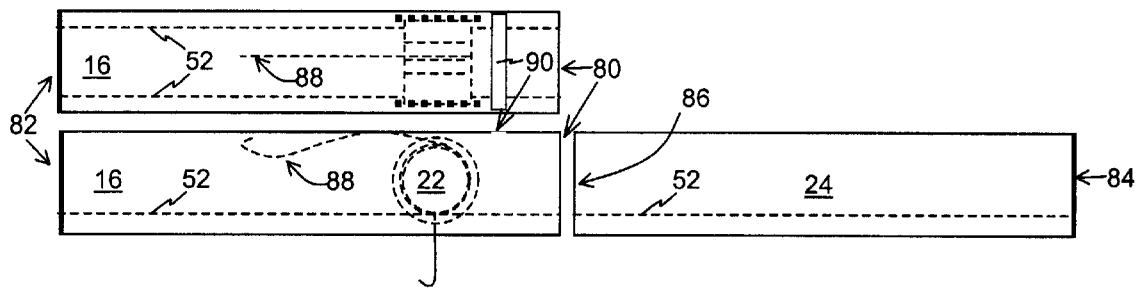
Fig. 6A
Fig. 6B
Fig. 6C
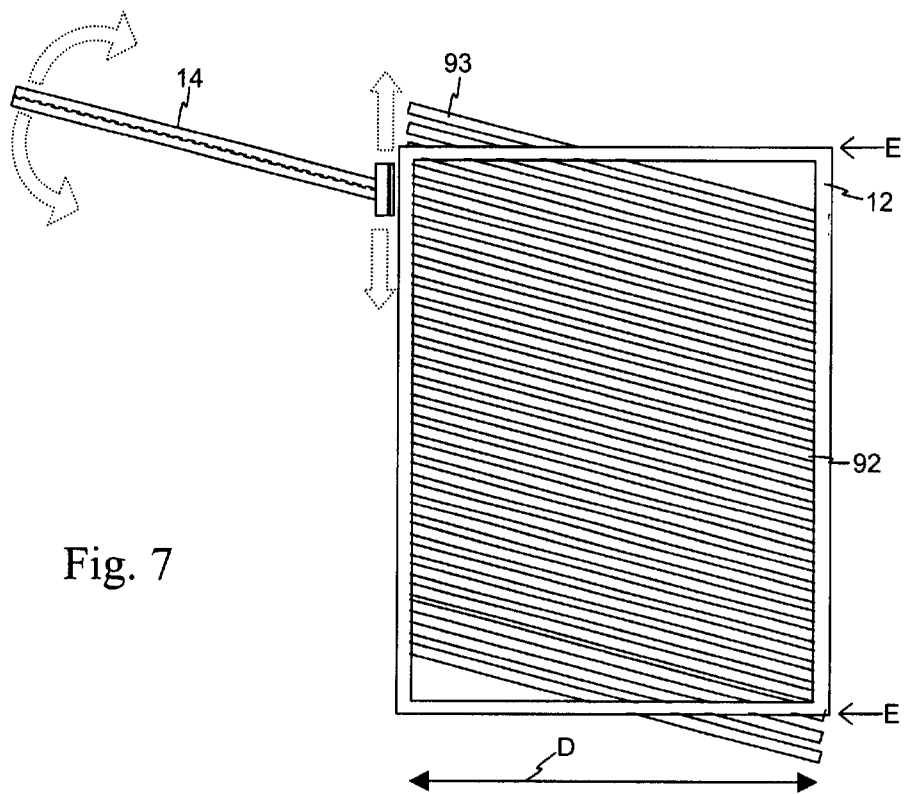
Fig. 7

PLANAR STORAGE AND DISPLAY DEVICE

RELATED APPLICATIONS

This application claims the priority of copending U.S. provisional patent application No. 60/215,628 filed Jun. 30, 2000.

BACKGROUND OF THE INVENTION

1. Field of the Invention

This invention relates to storage and display devices and more specifically to a storage and display device for planar items such as rugs and doors.

2. Description of the Prior Art

Conventional displays for planar items such as rugs are generally piles of rugs atop each other. A customer wishing to see a rug below the top item on the pile requires the merchant to physically move the items on the top of the desired item. This necessitates another space for the removed items to be placed and a great deal of lifting for the merchant.

What is needed is a display system that permits easy display of planar items and also requires a minimum of physical effort by the merchant to remove and display items in the display.

SUMMARY OF THE INVENTION

In a first aspect, the present invention provides a storage frame including one or more storage tracks and a display frame with a movable display track. The storage frame and tracks may be used to store one or more planar items. The display frame may be aligned with a storage track to accept the item stored on the storage track. The loaded display track may be lowered and/or pivoted to display the item. The display track may also be used to unload one or more items from storage.

In another aspect, the present invention provides two or more storage frames that may be stacked vertically to provide incremental vertical storage. One display track and frame may be used to display and unload items from two or more stacked storage frames.

In mother aspect, the present invention provides two or more storage frames that may be aligned horizontally to provide incremental horizontal storage. One display track and frame may be used to display and unload items from two or more aligned and or stacked storage frames.

In still another aspect, the present invention provides a display frame including a display track for display and unloading planar items. The display frame and track may be pivoted to minimize overhead interference and for ease of display. Pivot motion of the display frame and track also permits storage tracks to be mounted at angles between 30 and 150 degrees relative to the front of the storage frame and remain accessible to the display tracks. The display frame may also include a mechanism for raising and lowering the display track. The mechanism may include a motor and or a counterbalance. The mechanism may also be computer controlled.

In still another aspect of the present invention, the storage tracks and display tracks may be tubular or rectangular to selectable load capacity and stability depending on the items to be displayed. For doors and other heavy planar items rectangular tracks may be preferred. Storage and display tracks may also include one or more safety devices to prohibit items from being withdrawn from a storage track if the display track is not present or properly aligned.

These and other features and advantages of this invention will become further apparent from the detailed description and accompanying figures that follow. In the figures and description, numerals indicate the various features of the invention, like numerals referring to like features throughout both the drawings and the description.

BRIEF DESCRIPTION OF THE DRAWINGS

FIG. 6A is a detailed top view of a storage track and support.

FIG. 6B is a detailed side view of a storage track and support.

FIG. 6C is a detailed side view of a display track.

FIG. 7 is a top view of a storage frame and skewed storage tracks according to the present invention.

DETAILED DESCRIPTION OF THE PREFERRED EMBODIMENT(S)

Figure 1:
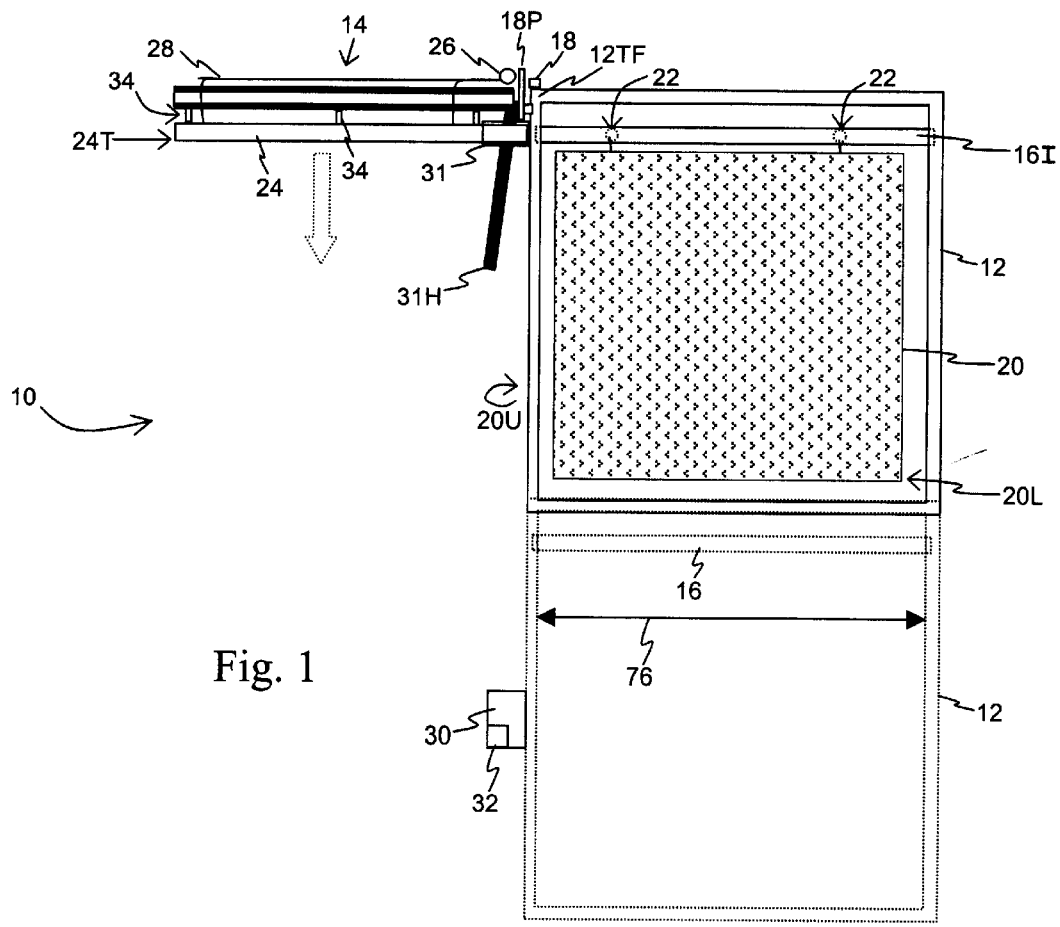
FIG. 1 is a side view of storage and display device according to the present invention.

Referring now to FIG. 1, storage and display apparatus 10 includes one or more storage frames 12 and display frame 14 for storing and displaying items such as item 20. Storage frames such as storage frame 12 may be modular and thus stacked as shown to provide increased storage capacity. Storage frame 12 may include one or more storage tracks 16, and each storage frame may also contain one or more item supports such as supports 22.

In a currently preferred embodiment of the present invention, display frame 14 is supported by display truck 18 which is movable along storage top bar 12TF, and display frame 14 may also pivot about pivot 18P. Display truck 18 may use any suitable technique for horizontally aligning display track 24 with storage tracks 16. Display track 24 may be raised and lowered using any suitable technique. Display track 24 may be raised and lowered using motor 26 and cable 28. Motor 26 may be controlled from controller 30 that may include computer 32. In the fully retracted position as shown in FIG. 1, display track 24 is secured adjacent one or more alignment stops such as stop 34. Stops 34 vertically align display track 24 with storage tracks 16 and horizontally align display track 24 with display frame 14. Alignment sleeve 31 may be provided to simultaneously engage display track 24 and a storage track such as storage track 16I. Alignment handle 31H may pivotally attach to display frame 14 and to alignment sleeve 31 to permit alignment sleeve 31 to be moved from fully engaging display track 24 to simultaneously engage display track 24 and storage track 16I. Any other suitable apparatus for aligning storage and display tracks and safely conducting display items such as item 20 may also be used.

Display truck 18 and display frame 14 may also include one or more safety features such as proximity lock 34P which restrains display truck 18 from lateral movement unless display track 24 is gully retracted. Proximity lock 34P may also prohibit removal of an item support, such as support 22, from display track 24 unless display track 24 is fully retracted and aligned with a storage track.

Figure 2:
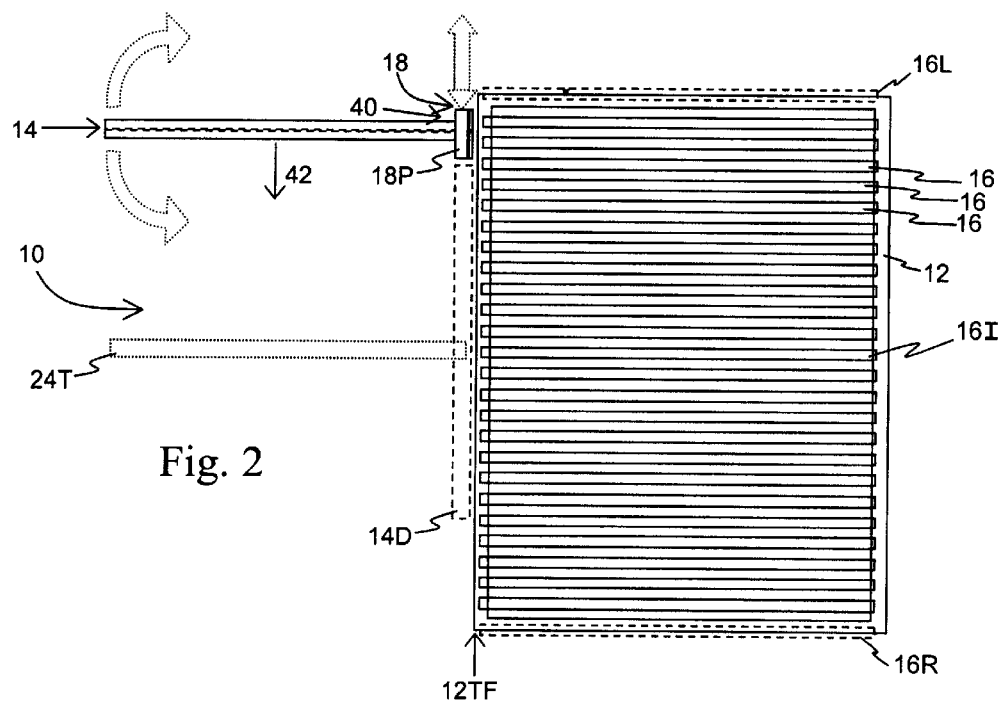
FIG. 2 is a top view of the device of FIG. 1.

Referring now to FIG. 2, storage and display apparatus 10 is shown in a top view. Display frame 14 may be pivoted as shown. For display, an item may be placed onto display track 24 and display frame 14 may be pivoted onto position 14D to fully exhibit the item and cover or shield other items stored on storage tracks 16. Display truck 18 may be restrained from lateral motion unless display frame 14 is perpendicular to element 12TF. Additional storage tracks 16L and 16R may also be included to display an item such as item 20 and shield storage frame 12 and additional items from view. Storage and display apparatus 10 may also include one or more display trucks 18, each display truck 18 including a display frame 14.

As an example, consider that item 20 may be a rug that is to be removed from storage for display. Display track 24 is raised to position 24T and display truck 18 is moved horizontally to bring display track 24 into alignment with storage track 16I on which item 20 is stored. If alignment sleeve 31 is included, alignment sleeve is moved to engage display track 16I. Item 20 is drawn from storage track 16I along support line 76 onto display track 24. Display track 24 may be lowered to permit item 20 to be laid flat upon the ground. If item 20 is a door or other planar item, lowering display track 24 may be done to bring the item to the ground and not lay it down flat.

In currently preferred embodiment of the present invention, if item 20 is a rug, there may be coordinated movement between display frame 14 and display track 24 as item 20 is being lowered. When item 20 is on display track 24, display truck 18 may be put in display position 40. Upon lower surface 20L contacting the ground, display truck 18 may move as shown by arrow 42 to place lower surface 20L of item 20 in contact with the ground and permit upper surface 20U to be viewed.

Figure 3:
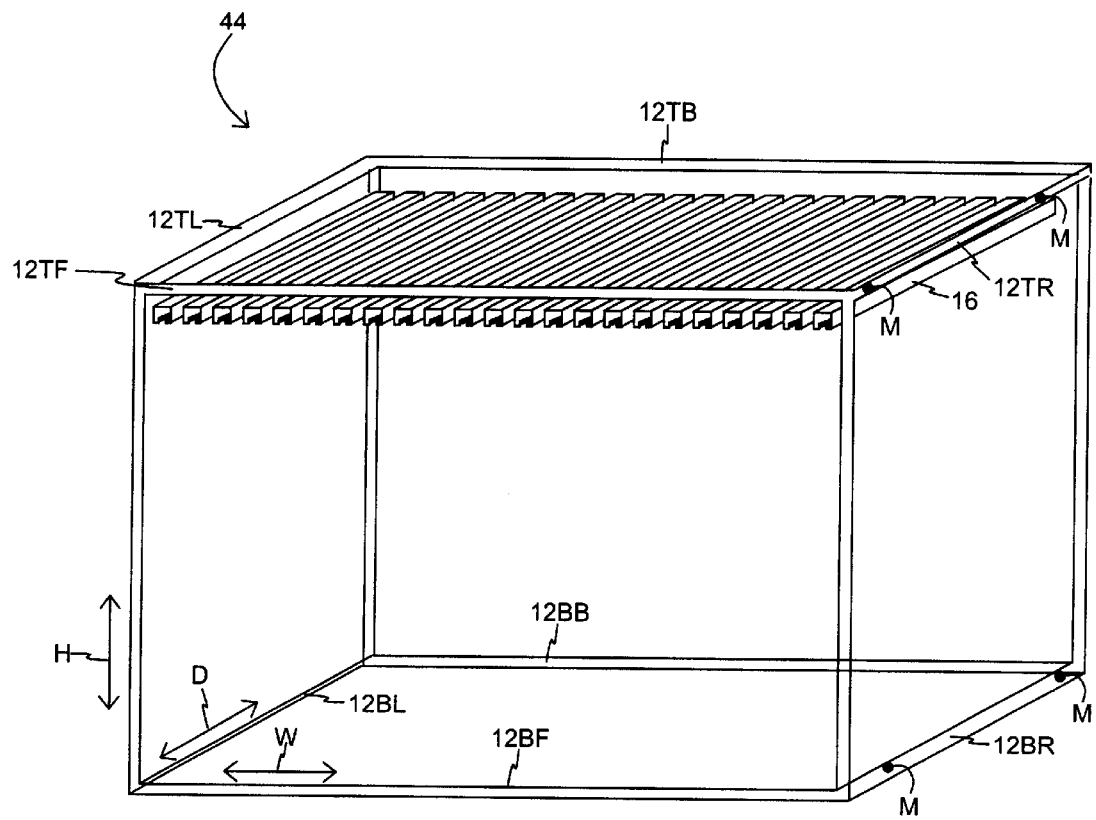
FIG. 3 is a perspective view of a storage frame and storage tracks according to the present invention.

Referring now to FIG. 3, storage frame 12 and storage tracks 16 are shown in perspective. Any suitable conventional method may be used to secure storage tracks 16 to storage frame 12. Height H, width W and depth D may be adjusted to accommodate items to be stored on storage tracks 16. Elements 12TF, 12TB, 12TR and 12TL compose top frame 44 and elements 12BF, 12BB, 12BR and 12BL compose bottom frame 46. Bottom frame 46 and top frame may have interlocking or mating elements M to permit stacking two or more storage frames 12. Storage frames 12 may also be arranges side-by-side to permit one display frame 14 to service adjacent racks.

Figures 4A, 4B, 4C:
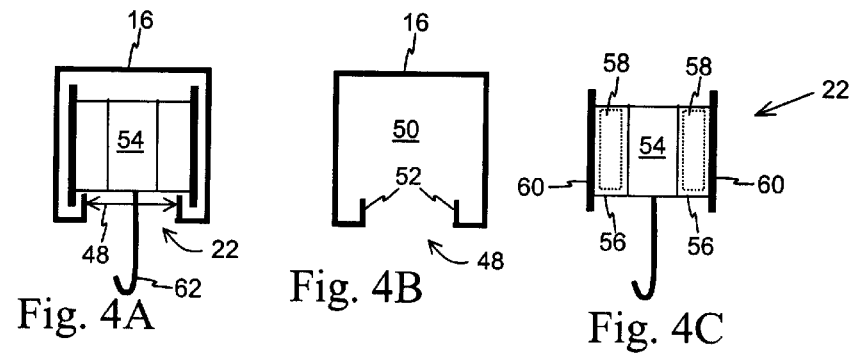
FIG. 4a, is an end view of a storage or display track and item support bearing according to the present invention.
FIG. 4B is an end view of a storage or display track according to the present invention.
FIG. 4C is an end view of an item support bearing according to the present invention.

Referring now to FIGS. 4A, 4B and 4C end views of a storage track 16 and support 22 are shown. As shown in FIG. 4B storage tracks 16 is generally rectangular having an access channel 48 to permit access to interior 50. Display track 24 may be similar to storage track 16. Interior rails 52 may be included to increase the rigidity of storage track 16. Support 22 may have a non-rotating element 54 and rotating elements 56 which may include bearings 58. Support 22 may also include flanges 60 to stabilize support 22 within storage track 16 as shown in FIG. 4A. Support element 62 may be connected to non-rotating element 54 and extend through access channel 48 for support of items such as item 20.

Figure 5:
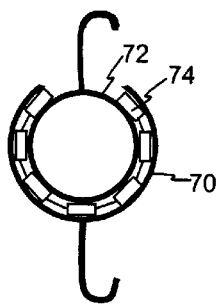
FIG. 5 is an end view of an alternate embodiment of the storage track and item support bearing of FIG. 4A.

Referring now to FIG. 5, in an alternate embodiment, storage tracks 16 and supports 22 may be replaced by channel 70 and tubular support 72. Relative motion between channel 70 and tubular support 72 may be controlled by one or more sets of bearings such as bearing set 74. Use of tubular support may provide linear stability along support line 76 as shown in FIG. 1 for items lacking sufficient inherent linear stability.

Referring now to FIGS. 6A, 6B and 6C showing in close-up some of the safety features according to the present invention. Storage tracks 16 have an access end 80 and a closed end 82. Display track 24 includes closed end 84 and access end 86. Supports such as support 22 may also include one or more safety devices such as safety snag 88. In a currently preferred embodiment of the present invention, safety snag 88 may be spring loaded to support 22. If support 22 were to exit storage track 16 without display track 24 in place as shown, safety snag 88 would rise to engage safety window 90 and prevent an item supported by support 22 from falling freely from storage track 16.

Referring now to FIG. 7, in an alternate embodiment of the present invention storage tracks attached to storage frame 12 may be skewed to permit storage of items having dimensions longer than depth D. Storage tracks such as storage track 93 may also extend beyond the edge E of storage frame 12. Item 20 may be removed from a skewed storage track such as storage track 92 using the pivot capabilities of display frame 14.

Figure 8:
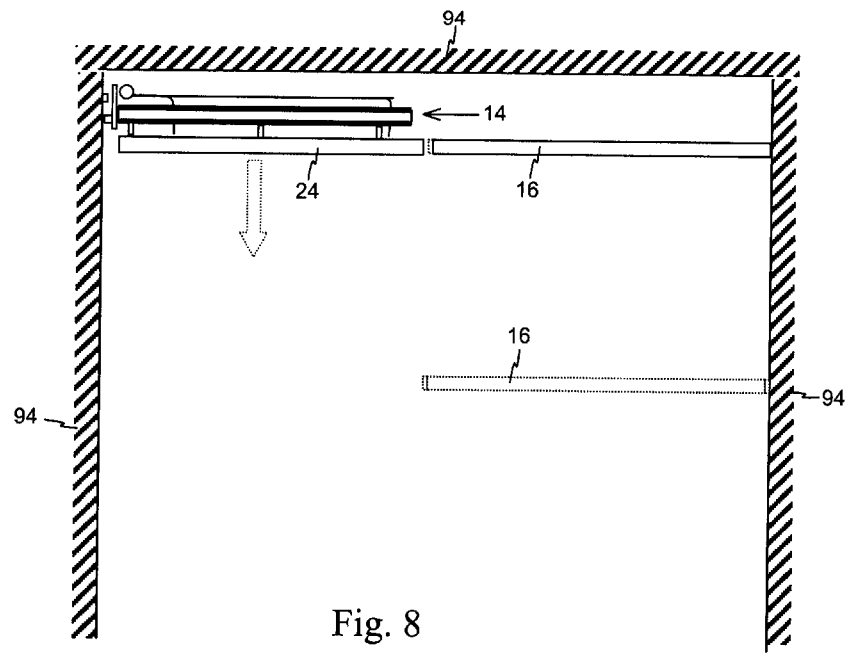
FIG. 8 is a side view of an alternate embodiment of stacked storage frames and storage tracks according to the present invention.

Referring now to FIG. 8, in another alternate embodiment of the present invention storage tracks 16 and display frame 14 may be supported by building elements 94.

Figure 9:
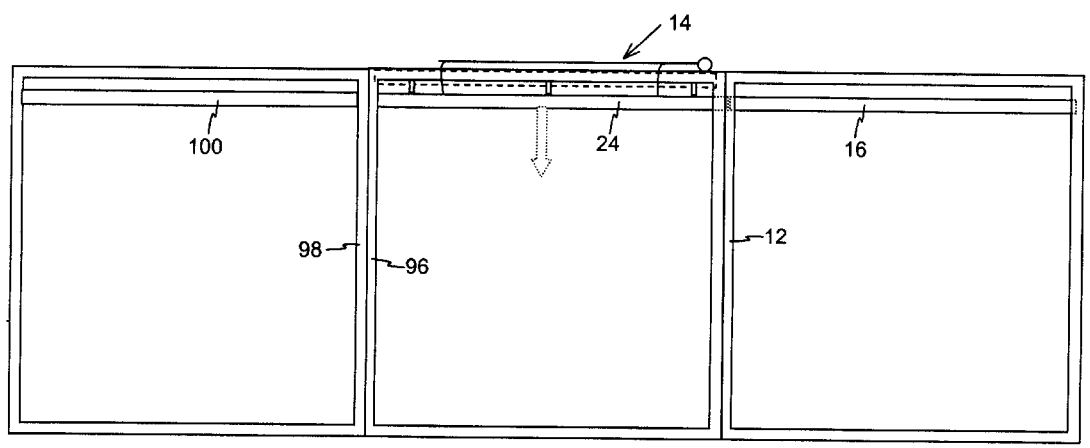
FIG. 9 is a side view of another alternate embodiment of a storage and display device according to the present invention.

Referring now to FIG. 9, in still another alternate embodiment of the present invention display frame 14 may be supported by display rack 96. Display rack 96 may be attached to storage frame 12 to maintain precise alignment between display track 24 and storage tracks 16. Additional storage frames 98 may also be added to permit display frame 14 to store and display items on both storage frame 12 and storage frame 98. Storage frame 98 may include one or more storage tracks 100.

Figure 10:
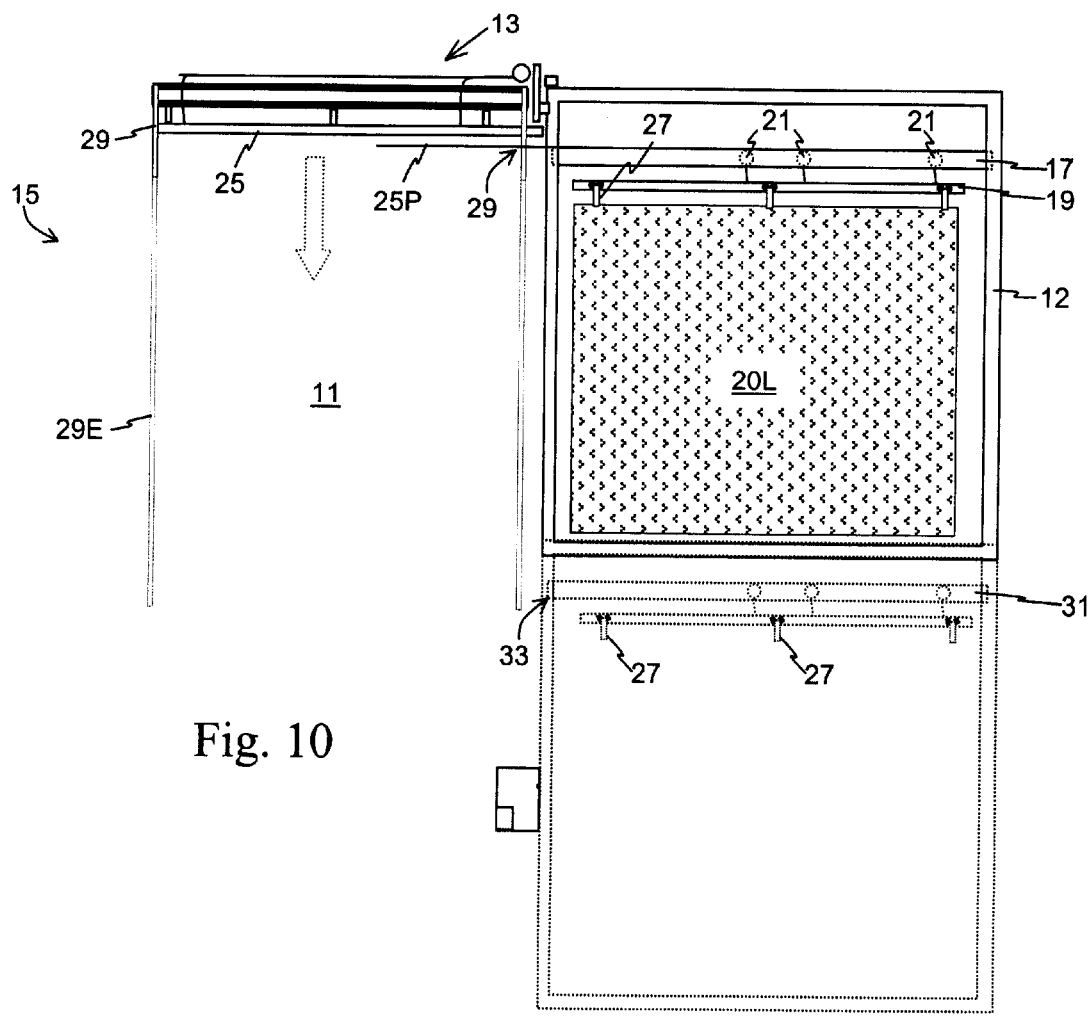
FIG. 10 is a side view of still another alternate embodiment of a storage and display device according to the present invention.

Referring now to FIG. 10, in a still further embodiment of the present invention, storage and display device 15 includes the capability to easily preview items stored before fully removing an item from storage frame 12. Preview track 17 is similar to those already discussed and includes support rollers 21. Two or more support rollers 21 may connect and support an open storage track 19. Item 20 may be supported from open storage track 19 by two or more open rollers 27. In practice, item 20 may be previewed by drawing item 20 from storage frame 12. Without display frame 13 and open display track 25 aligned with open storage track 19, open rollers 27 provide minimum motion relative to open storage track 19 and thus open storage track 19 moves relative to preview track 17 on support rollers 21. Support rollers 21 may only permit storage track 19 to be drawn partially from storage frame 12 thus providing a preview of item 20.

In this embodiment, in its fully up position 25U, open display track 25 is secured above horizontal plane 25P containing preview track 17 or open storage track 19. This arrangement permits preview of items stored on preview tracks 17. Guides 29 may also be added to maintain proper alignment between open display track 25 and open storage track 19 when removing an item from storage. In cases where multiple storage frames 12 are stacked guide extensions 29E may be used. End 31 of preview tracks 17 may also be attached to 12 at a lower elevation than end 33 permitting gravity retention of stored items.

Figures 11A, 11B, 11C:
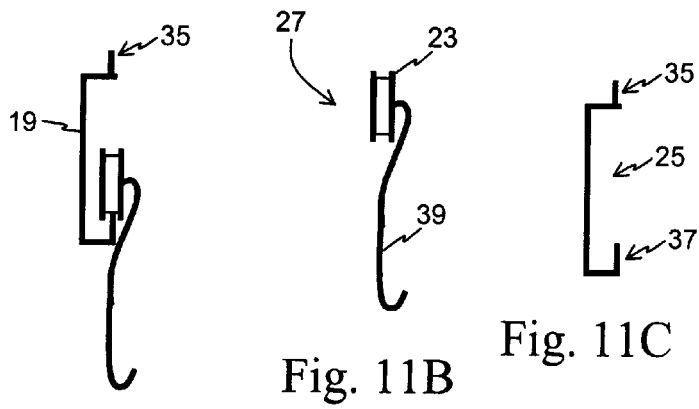
FIG. 11a, is an end view of a preview or display track and item display bearing according to the present invention.
FIG. 11B is an end view of an item display bearing according to the present invention.
FIG. 11C is an end view of a preview or display track according to the present invention.

Referring now to FIGS. 11A, 11B and 11C end views of open storage track 19 or open display track 25 and open rollers 27 are shown. Open storage track 19 or open display track 25 include roller track 37 and may be supported by attachments 35. Open rollers 27 include two or more rollers 23 and item hanger 39.

Figure 12A:
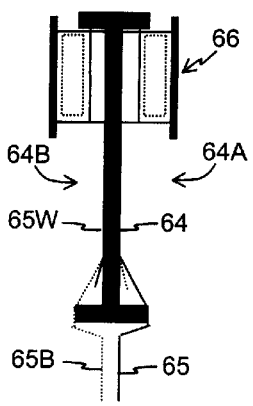
FIG. 12A is an end view of a display rail according to an alternate embodiment of the present invention.
Figure 12B:
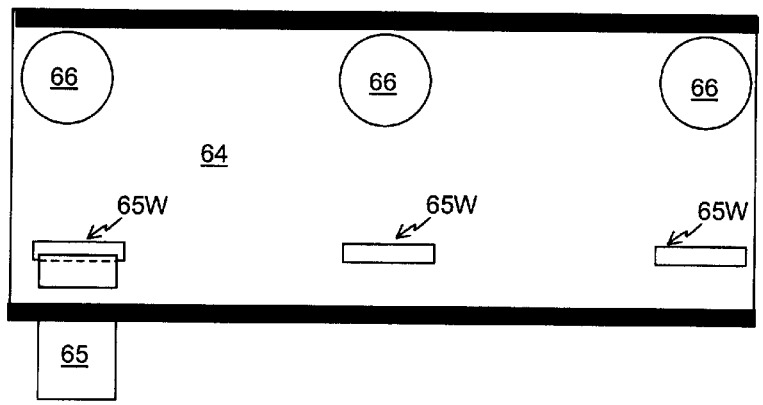
FIG. 12B is a side view of a display rail according to an alternate embodiment of the present invention.

Referring now to FIGS. 12A and 12B, an alternate embodiment is shown for support, preview and display of planar items having little or no rigidity. Preview or display rail 64 provides lateral rigidily and support and includes a plurality of bearing means 66. An item 20 may be attached to display rail 64 using item supports 65 which may be inserted through item windows 65W. In a currently preferred embodiment of the present invention item supports 65 may be inserted from a first side 64A as shown in FIG. 12A or alternated as illustrated by item support 65B inserted into item window 65W from alternate side 64B.

Having now described the invention in accordance with the requirements of the patent statutes, those skilled in the art will understand how to make changes and modifications in the present invention to meet their specific requirements or conditions. Such changes and modifications may be made without departing from the scope and spirit of the invention as set forth in the following claims.

I claim:
1. A display apparatus comprising:
   at least one display means for moveably supporting planar merchandise;
   at least two horizontally oriented storage tracks, each storage track supporting one of the at least one display means;
   means for supporting the at least two storage tracks in a generally parallel orientation;
   a display track;
   means for supporting the display track to permit transfer of one of the at least one display means from a selected one of said at least two storage tracks to the display track; and
   means for controllably raising and lowering the display track.
2. The display apparatus of claim 1 further comprising:
   an alignment sleeve for simultaneously engaging a selected one of the at least two storage tracks and the display track for the transfer of a selected one of the at least one display means.
3. The display apparatus of claim 2 further comprising:
   interlock safety means for disabling the means for controllably raising and lowering the display track if the alignment sleeve is simultaneously engaging the display rack and a selected one of said at least two storage tracks.
4. The display apparatus of claim 1 further comprising:
   track safety means for allowing only a partial removal of a selected one of the at least one display means from a selected one of the at least two storage tracks for display of merchandise.
5. The display apparatus of claim 1 wherein the at least two horizontally oriented storage tracks further comprise:
   a metal tube having a rectangular cross section and an upper and lower face and a channel in the lower face, the tube having a long axis with a generally horizontal orientation.
6. The display apparatus of claim 5 wherein the channel further comprises:
   two vertical supports attached to the channel perpendicular to the lower surface and extending into the tube and along the long axis.
7. The display apparatus of claim 1 wherein each display means further comprises:
   a laterally rigid rail member; and
   at least two bearing supports.
8. The display apparatus of claim 1 wherein each storage track further comprises:
   at least two bearing supports.
9. A rug display comprising:
   at least one movable display rail for supporting a rug including roller bearing supports;
   at least two horizontally oriented storage tracks, each storage track engaging and supporting the roller bearing supports of one of the at least one display rails;
   an open rectangular frame for supporting the at least two storage tracks in a generally parallel orientation;

a horizontally oriented display track, the display track engaging and supporting the roller bearing supports of a selected one of the at least one display rails;

means for supporting the display track to permit transfer of a selected one of the at least one display rails from a selected one of the at least two storage tracks to the display track;

a movable alignment sleeve for simultaneously engaging a selected one of the at least two storage tracks and the display track for the transfer of a selected one of the at least one display rails; and means for controllably raising and lowering the display track and a selected one of the at least one display rails and a rug.

10. The display apparatus of claim 9 further comprising:

track safety means for allowing only a partial removal of a selected one of the at least one display rails from a selected one of the at least two rage tracks for display of merchandise.

11. The display apparatus of claim 9 further comprising:

means for disabling the means for controllably raising and lowering the display track if the alignment sleeve is simultaneously engaging the display track and selected one of the at least two storage tracks.

12. The display apparatus of claim 9 further comprising:

means for retaining a selected one of the at least one display rail in the display track unless the display track is proximate the means for supporting the display track.

13. The display apparatus of claim 9 further comprising:

means for retaining a selected one of the at least one display rail in the display track unless the display track is proximate the means for supporting the display track and aligned with a selected one of the at least two storage tracks.

* * * * *